United States Patent [19]

Song

[11] Patent Number: 5,083,072
[45] Date of Patent: Jan. 21, 1992

[54] POSITION CONTROL MEANS AND METHOD FOR SERVO MOTOR

[75] Inventor: Jin Il Song, Inchun, Rep. of Korea

[73] Assignee: Samsung Electronics Co. Ltd., Suweon, Rep. of Korea

[21] Appl. No.: 456,788

[22] Filed: Dec. 29, 1989

[30] Foreign Application Priority Data

Dec. 30, 1988 [KR] Rep. of Korea .................. 17942/88

[51] Int. Cl.$^5$ ........................................... G05B 19/18
[52] U.S. Cl. ................................... 318/571; 318/626; 318/632; 364/474.35
[58] Field of Search ............................... 318/560–640; 364/513, 189–193, 171–177

[56] References Cited

U.S. PATENT DOCUMENTS

| | | | |
|---|---|---|---|
| 4,143,310 | 3/1979 | Fujinawa et al. | 318/571 |
| 4,471,443 | 9/1984 | Kinoshita et al. | 318/634 X |
| 4,518,909 | 5/1985 | Friedli et al. | 318/566 |
| 4,581,698 | 8/1986 | Jaswa . | |
| 4,587,618 | 5/1986 | Oguchi | 901/9 X |
| 4,600,985 | 7/1986 | Nozawa et al. | 318/571 X |
| 4,656,405 | 4/1987 | Kiya et al. | 318/571 |
| 4,750,104 | 6/1988 | Kumamoto et al. | 318/632 X |
| 4,782,275 | 11/1988 | Sakamoto et al. | 318/572 X |
| 4,814,998 | 3/1989 | Aramaki | 364/474.35 X |
| 4,864,508 | 9/1989 | Iwagaya | 318/632 X |
| 4,902,950 | 2/1990 | Kawamura et al. | 318/626 X |

FOREIGN PATENT DOCUMENTS 61-245209 10/1986 Japan .

*Primary Examiner*—Paul Ip
*Attorney, Agent, or Firm*—Sterne, Kessler, Goldstein & Fox

[57] ABSTRACT

A position control apparatus and method for controlling a servo motor includes a D/A unit which converts speed command to analog signals, an up/down counter which increases and decreases pulse of encoder based on the rotating direction of a servo motor in either the x or y directions, and a timer periodically generating interrupt signal to a microprocessor. The position control apparatus and method that can control a servo motor by calculating simple linear equation without calculating complicated exponential function if the maximum speed of the servo motor and time required for the servo motor to reach its destination position is furnished to the control system.

2 Claims, 4 Drawing Sheets

POSITION CONTROL MEANS AND METHOD FOR SERVO MOTOR

BACKGROUND OF THE INVENTION

1. Field of the Invention

The invention relates to position control means and a method to control the speed pattern of servo motors by exponential deceleration and acceleration. Particularly, even if the speed pattern of a servo motor is expressed as the exponential function, the invention relates to position control means and a method which decide destination position at every sampling time by calculating a linear equation forming an exponential function curve instead of calculating a complicated exponential function.

2. Related Art

Conventionally, when the speed of a servo motor is exponentially controlled in a position control system, (as shown generally in FIG. 2), in acceleration, the speed of a motor v(t) is:

$$v(t) = Vmax * \{1 - exp(-t/\tau)\}$$

and, at every sampling time, the speed of a motor is:

$$v(Ts) = Vmax * \{1 - exp(-Ts/\tau)\}$$

The destination position at a sampling time $T_s$ is produced by the equation:

$$S(Ts) = v(Ts) * Ts = Vmax * \{1 - exp(-Ts/\tau)\} * Ts.$$

In a deceleration interval, the speed of a servo motor is:

$$v(t) = Vmax * exp(-t/\tau)$$

and at every sampling time Ts, the speed of a servo motor, v(Ts) is:

$$v(Ts) = Vmax * exp(-Ts/\tau).$$

At every sampling time $T_s$, the destination position is:

$$S(Ts) = v(Ts) * Ts = Vmax * exp(-Ts/\tau) * Ts.$$

Hence, the arithmetic time is relatively long. This creates defects in the control system of the servo motor, resulting in unsafe servo control.

SUMMARY OF THE INVENTION

The present invention involves inputting maximum servo motor speed and the time required for transferring equipment (positioning via one or more servo units) to a destination position indicated by the control means. Setting the speed pattern of the servo motor to an exponential function can yield acceleration and deceleration by simple calculation of a linear equation without calculating a complicated exponential function, as was done conventionally.

Such a result is achieved by utilizing: a digital-to-analog (D/A) unit which converts speed commands to an analog signal; an up/down counter which increases and decreases the pulse of an encoder based on the rotating direction of a servo motor in both the x and y directions; and a timer for periodically generating and outputting an interrupt signal to a microprocessor. In addition, the present invention includes: methods for calculating the difference between current and final destination positions; methods which calculate the number of sampling times; methods which produces position commands in random time; and methods which produce speed commands from other processes and repeatedly perform the processes until transferring equipment reaches the final destination position.

DETAILED DESCRIPTION OF THE INVENTION

Figure 1:
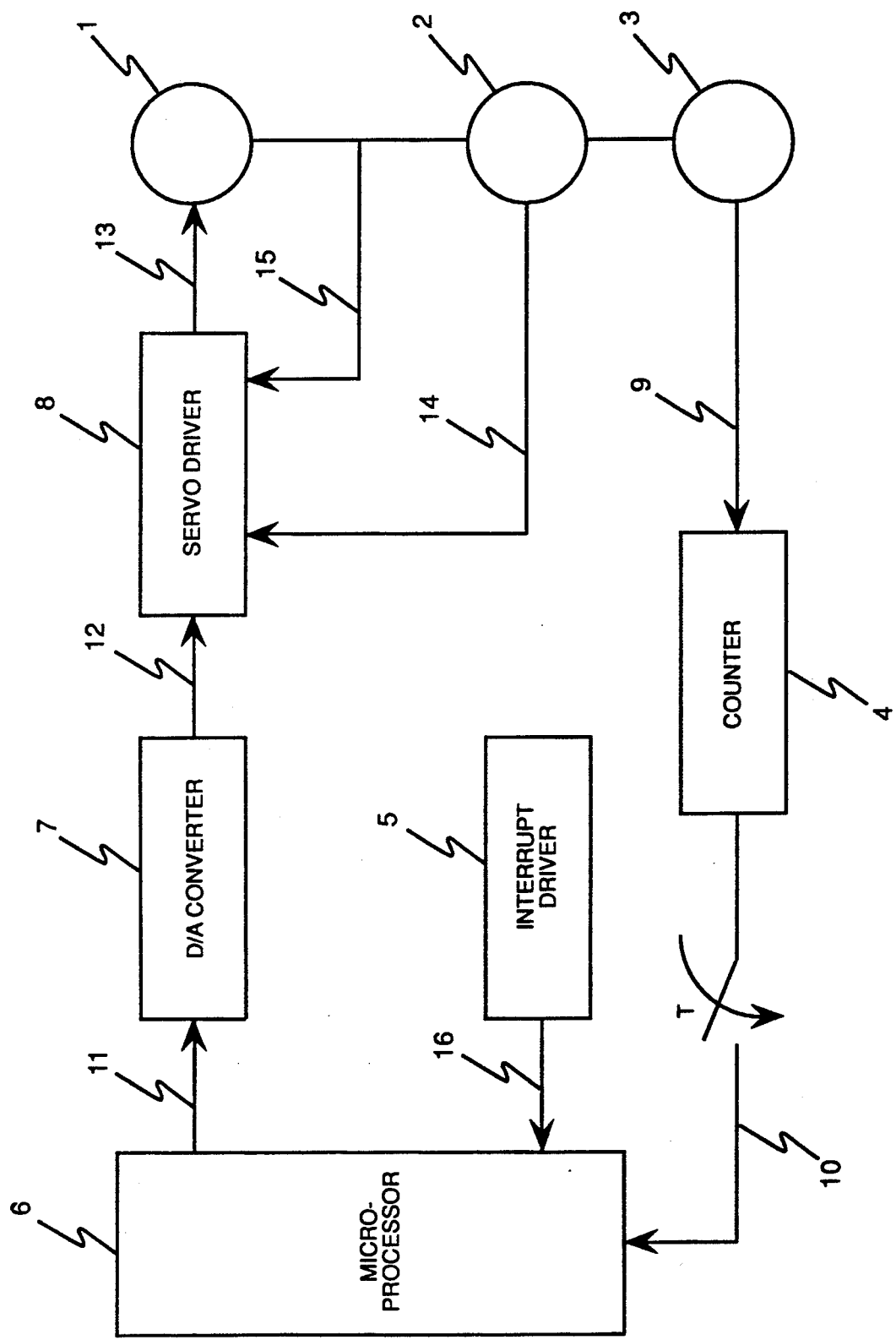
FIG. 1 is a block diagram showing an embodiment of position control means for a servo motor according to the invention.

FIG. 1 is a block diagram showing an embodiment of a position control means for a servo motor according to the present invention. Servo motor 1 is an actuator and an object of position control. A tacho-generator 2 detects the current speed of servo motor 1. An encoder 3 is used to detect the current position of the servo motor.

A counter 4 counts pulses 9 obtained from encoder 3 and outputs a signal(s) 10 corresponding to the current position of servo motor 1 to a microprocessor 6 which calculates the position deviation between a destination position and current position of servo motor 1. The microprocessor also performs trajectory planning with a speed pattern representative of exponential acceleration and deceleration. D/A converter 7 converts a digital speed command 11 from the microprocessor to an analog speed command 12.

Servo driver 8 controls electrical current 13 supplied to servo motor 1 by processing speed commands 12 received from D/A converter 7 as a reference input, feedback signals(s) 14 from generator 2 corresponding to the current speed of servo motor 1, and feedback current 15 from servo motor 1.

Figure 2:
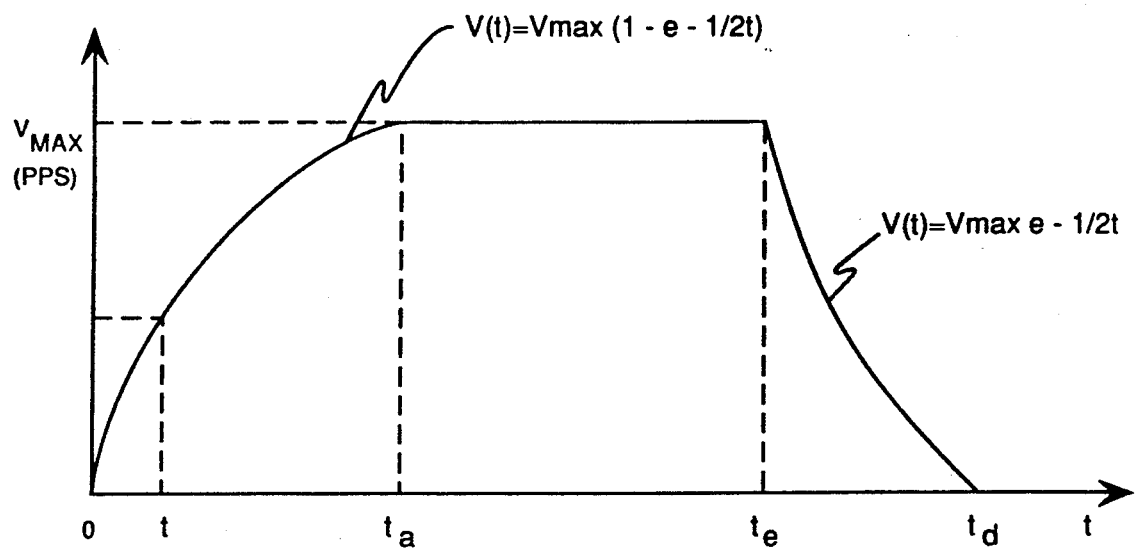
FIG. 2 is a diagram showing a speed pattern of a servo motor over time according to the invention.

FIG. 2 depicts an exponential speed pattern of servo motor 1 along the y-axis, according to varying time shown on the x-axis. Time from 0 to $t_a$ is an acceleration period, time from $t_a$ to $t_e$ represents a uniform speed period, and time from $t_e$ to $t_d$ is a deceleration period.

Figure 3:
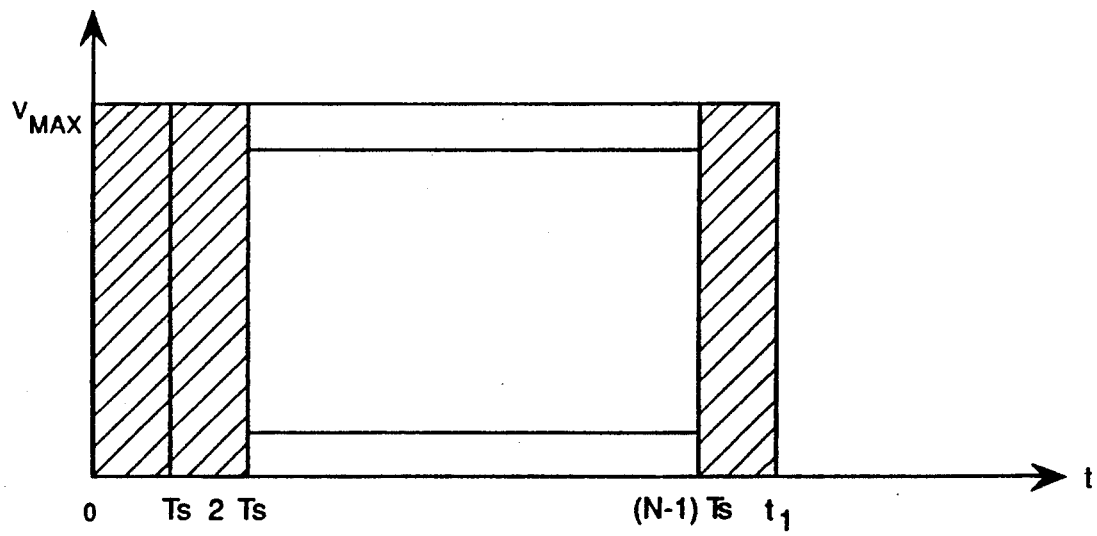
FIG. 3 is a diagram showing the distance which transferring equipment reaches every sampling time at uniform speed according to the invention.

FIG. 3 shows the distance which transferring equipment (propelled by one or more servo motors) reaches every corresponding sampling time at uniform speed. If the current sampling time $T_s$ is 1 msec, maximum speed is 100 kpps (pps=pulse per second), and if the position control time $t_1$ is 2 sec (for example), the distance required to reach every sampling time, the destination position S(Ts), is:

$$S(Ts) = 100 \text{ kpps} * 1 \text{ msec} = 100 \text{ pulse,}$$

and the number of sampling times N is:

$$N = 2 \text{ sec}/1 \text{ msec} = 2000 \text{ times.}$$

In exponential acceleration and deceleration, speed pattern v'(k+1) is obtained by the equation:

$$V'(k+1) = V'(k) + [V_{max} - V'(k)]/J$$

Figure 4:
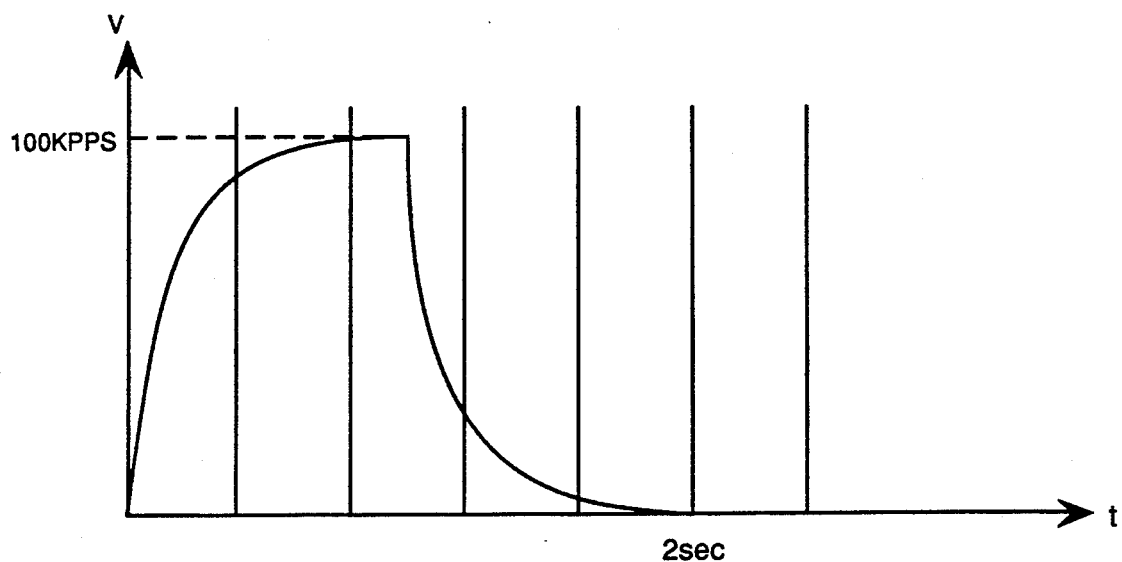
FIG. 4 is a diagram showing an exponential speed pattern produced by a method according to the invention.

(where: $V'(0) = 0$, and J is a data constant adjusting a grade of speed pattern in acceleration and deceleration), and, if maximum speed Vmax is 100 kpps, calculating V'(k+1) every sampling time is an exponential speed pattern as shown in FIG. 4.

Microprocessor 6 receives data 10 of the current position of servo motor 1 from counter 4. Microprocessor 6 calculates the deviation between the current position and the destination position, forces the deviation to be an absolute value, and calculates the sampling times. Then sampling times N become:

$$N = \frac{|Dp - Cp|}{V_{max} * Ts}$$

(where:
Dp = the final destination position
Cp = current position
Vmax = maximum speed)
and from the speed pattern V'(k+1):

$$P'(k+1) = P'(k) + [S(Ts) - P'(k)]/J]$$

Figure 5:
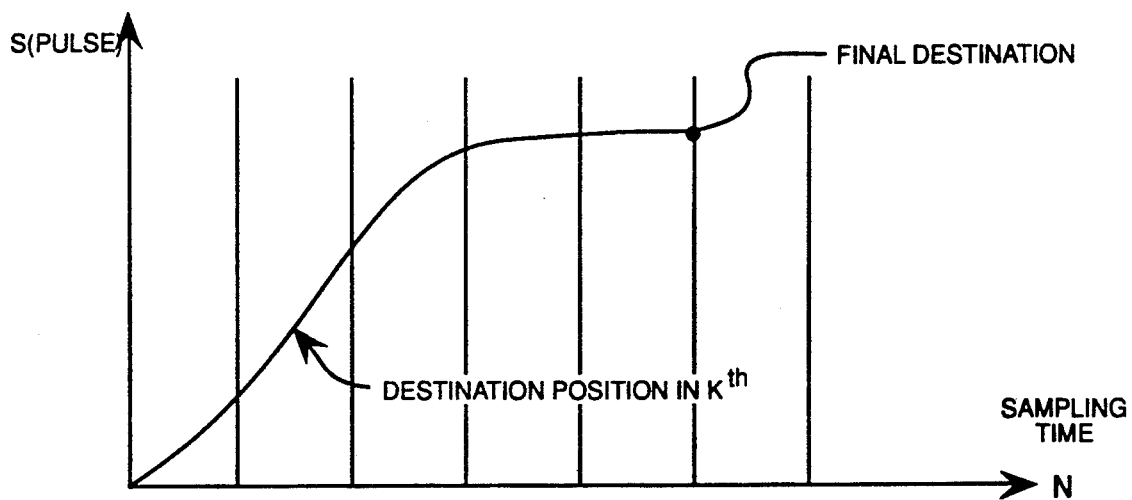
FIG. 5 is a curve showing destination position based on sampling time according to the invention.

(where: $P'(0) = 0$ and S(Ts) is the position reaching every sampling time at uniform speed as shown in FIG. 3) is calculated. If P'(k+1) is calculated every sampling time, the destination position curve is obtained as shown in FIG. 5.

Figure 6:
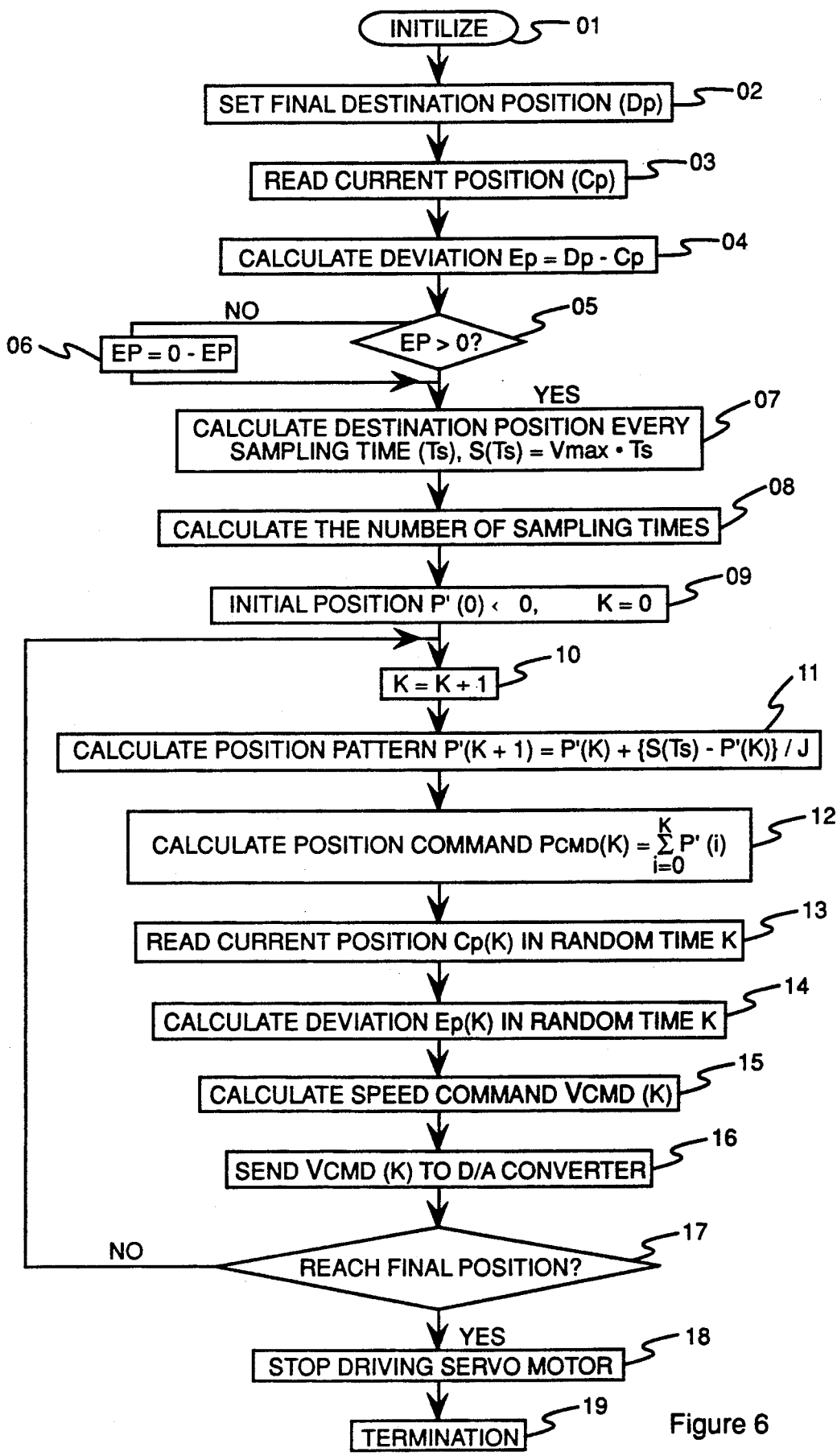
FIG. 6 is an explanatory flow chart according to the invention.

FIG. 6 is an explanatory flow chart according to the present invention. The system is initialized in step 01. The final destination position Dp is set in step 02. In step 03, the microprocessor reads the current position Cp of servo motor 1 from counter 4 by executing a set of instructions. The microprocessor obtains position deviation Ep by execution of the equation: Ep = Dp − Cp, in step 04, and creates the absolute value of Ep in steps 05 and 06.

Destination position S(Ts) (which is typically reached at every sampling time) is obtained by multiplying the maximum speed Vmax by sampling time Ts in step 07. The sampling times are obtained by execution of equation: N = Ep/ S(Ts), in step 08. Next, initial position P'(0) of the servo motor is initialized by setting P'(0) equal to 0 in step 09. Every time timer 5 interrupts microprocessor 1 (via signal(s) 16, see FIG. 1), k is set to k+1 in step 10 and position pattern P'(k+1) is obtained by execution of the equation: P'(k+1) = P'(k) + [S(Ts) − P'(k)]/J, in step 11. Pulses are accumulated until random time k is added and position command $P_{CMD}$ is calculated by execution of the following equation in step 12:

$$P_{CMD}(k) = \sum_{i=0}^{k} P(i)$$

Also, current position Cp(k), at random time k, is read from counter 4 in step 13 and, and position deviation Ep(k) is obtained by execution of equation: Ep(k) = $P_{CMD}$(k) − Cp(k), in step 14. Speed command $V_{CMD}$ is obtained by execution of equation: $V_{CMD}$(k) = Ep(k) * Kp, in step 15 (where Kp is the position at time K), and the value is sent to D/A converter 7 in step 16. Thereafter, a set of instructions indicated at step 17 is executed to check whether servo motor 1 has reached its final destination position. The microprocessor repeats process steps 10 to 17 in accordance with the loop conditions. When servo motor 1 reaches its final destination position, driving of the servo motor is terminated in step 18, and all processes are terminated in step 19.

If the maximum speed of the servo motor and the time which it takes to reach the final destination position is set in accordance with the control system described above, the servo motor is able to be exponentially controlled by calculating a simple linear equation without calculating complicated exponential functions. Therefore, the invention has the advantage of obtaining safe position control of the servo motor through a simplified control sequence.

What is claimed is:

1. A position control system for controlling the exponential acceleration and deceleration pattern of a servo motor, said position control system comprising:

at least one servo motor for transferring equipment, said motor cable of outputting a first feedback signal;

microprocessing means for generating a digital speed command signal using linear equations, said microprocessor means comprising means for calculating a position deviation between a destination position and a current position of said at least one servo motor;

interrupt means for periodically sending an interrupt signal to said microprocessing means;

speed detecting means for determining current servo motor speed, and outputting a second feedback signal;

encoder detecting means for determining the current position of said servo motor and outputting pulses corresponding to the current position of said servo motor;

converter means for converting said digital speed command signal to an analog speed command;

counting means for counting pulses obtained from said encoder detecting means and outputting a position signal corresponding to the current position of the servo motor to said microprocessor means;

servo driver means for supplying electrical current to said at least one servo motor by processing said analog speed command signal as reference input, and said first and second feedback signals.

2. A position control method for controlling exponentially the speed of a servo motor in a microprocessor controlled system by linear calculations, comprising:

(a) setting a final destination position Dp for a servo motor;
(b) reading a current position Cp of the servo motor;
(c) obtaining a position deviation Ep by setting Ep = Dp − Cp;
(d) taking the absolute value of the position deviation Ep;
(e) calculating the destination position reached every sampling time S(Ts) by multiplying a maximum speed Vmax by a sampling time Ts;
(f) obtaining sampling times N by setting N = Ep/S(Ts);
(g) clearing an initial position P'(0) of the servo motor by setting P'(0) equal to 0;
(h) calculating position command:

$$P_{CMD}(k) = \sum_{i=0}^{k} P'(i)$$

at a random time k after calculating a position pattern $P'(k+1)=P'(k)+[S(Ts)-P'(k)]/J$ every time an interrupt signal is received (J being a data constant);

(i) reading current position Cp(k) at random time k from a counter;

(j) calculating position deviation:

$$Ep(k) = P_{CMD}(k) - Cp(k);$$

(k) obtaining speed command VCMD(k) and multiplying Ed(k) * Kp;
(l) sending said speed command $V_{CMD}(k)$ to a D/A converter to change the servo motor speed;
(m) performing process steps h−1 until the servo motor reaches the final destination position; and
(n) thereafter terminating servo motor driving.

* * * * *

UNITED STATES PATENT AND TRADEMARK OFFICE
CERTIFICATE OF CORRECTION

PATENT NO. : 5,083,072

DATED : January 21, 1992

INVENTOR(S) : Jin Li Song

It is certified that error appears in the above-indentified patent and that said Letters Patent is hereby corrected as shown below:

Drawings:

In Figure 2, equation "$V(t) = V_{max}\ 1 - e^{-1/2t}$" should read --$V(t) = V_{max}\ \{1 - \exp^{(-t/\tau)}\}$--, and equation "$V(t) = V_{max}\ e^{-1/2t}$" should read --$V(t) = V_{max}\ \{\exp^{(-t/\tau)}\}$--; and In Figure 6, at step 09, "$P'(0) < 0$" should read --$P'(0) \rightarrow 0$--, and at step 10, "$K = K \div 1$" should read --$K = K + 1$--.

Signed and Sealed this

Nineteenth Day of October, 1993

Attest:

BRUCE LEHMAN

*Attesting Officer*     *Commissioner of Patents and Trademarks*